United States Patent
Itoh

(10) Patent No.: US 8,643,863 B2
(45) Date of Patent: Feb. 4, 2014

(54) ELECTRONIC DEVICE CONFIGURED TO BE CONNECTED WITH A STORAGE MEDIUM INCLUDING A REGISTRATION UNIT CONFIGURED TO REGISTER INFORMATION THAT SPECIFIES THE MEDIA

(75) Inventor: Satoshi Itoh, Osaka (JP)

(73) Assignee: Kyocera Document Solutions Inc. (JP)

( * ) Notice: Subject to any disclaimer, the term of this patent is extended or adjusted under 35 U.S.C. 154(b) by 456 days.

(21) Appl. No.: 12/774,824

(22) Filed: May 6, 2010

(65) Prior Publication Data

US 2010/0290076 A1  Nov. 18, 2010

(30) Foreign Application Priority Data

May 12, 2009  (JP) ................................. 2009-115751

(51) Int. Cl.
*G06K 15/00* (2006.01)
(52) U.S. Cl.
USPC .......................... 358/1.14; 358/1.16; 358/444
(58) Field of Classification Search
USPC ................................................ 358/1.1–3.29
See application file for complete search history.

(56) References Cited

U.S. PATENT DOCUMENTS

| 2004/0172552 A1* | 9/2004 | Boyles et al. ................. 713/200 |
| 2006/0262356 A1 | 11/2006 | Honda et al. ................. 358/400 |
| 2007/0198795 A1* | 8/2007 | Harada ......................... 711/164 |
| 2007/0206216 A1* | 9/2007 | Sakagami et al. ........... 358/1.15 |

FOREIGN PATENT DOCUMENTS

| CN | 101321065 A | 12/2008 |
| JP | H7-287655 | 10/1995 |
| JP | 2007-213246 | 8/2007 |
| JP | 2008-263289 | 10/2008 |

* cited by examiner

*Primary Examiner* — Qian Yang
*Assistant Examiner* — Marcellus Augustin
(74) *Attorney, Agent, or Firm* — Ostrolenk Faber LLP

(57) ABSTRACT

An electronic device includes a connecting unit configured to be connected with a storage medium that is removable, the electronic device transmitting data with the storage medium that is connected with the connecting unit, a registration unit configured to register information that specifies the media that is permitted to transmit data with the electronic device, and a control unit configured to control whether to permit the electronic device to transmit data with the media that is connected with the connecting unit based on the information that is registered in the registration unit.

10 Claims, 5 Drawing Sheets

| | F1 | F2 | F3 | | | |
|---|---|---|---|---|---|---|
| | SERIAL NUMBER | AVAILABILITY INFORMATION | USB to PRINT | SCAN to USB | USB to BOX | BOX to USB |
| | OUT OF REGISTRATION | PARTLY AVAILABLE | | ○ | | |
| | E8F00095XXXX | ALL AVAILABLE | — | — | — | — |
| | E8F00096XXXX | ALL AVAILABLE | — | — | — | — |
| | E8F00097XXXX | PARTLY AVAILABLE | ○ | | ○ | ○ |
| | E8F00098XXXX | UNAVAILABLE | — | — | — | — |
| | ⋮ | ⋮ | ⋮ | ⋮ | ⋮ | ⋮ |

FIG. 5

| SERIAL NUMBER (F1) | AVAILABILITY INFORMATION (F2) | USB to PRINT (F3) | SCAN to USB (F3) | USB to BOX (F3) | BOX to USB (F3) |
|---|---|---|---|---|---|
| OUT OF REGISTRATION | PARTLY AVAILABLE | | O | | |
| E8F00095XXXX | ALL AVAILABLE | – | – | – | – |
| E8F00096XXXX | ALL AVAILABLE | – | – | – | – |
| E8F00097XXXX | PARTLY AVAILABLE | O | – | O | O |
| E8F00098XXXX | UNAVAILABLE | – | – | – | – |
| …… | …… | …… | …… | …… | …… |

ELECTRONIC DEVICE CONFIGURED TO BE CONNECTED WITH A STORAGE MEDIUM INCLUDING A REGISTRATION UNIT CONFIGURED TO REGISTER INFORMATION THAT SPECIFIES THE MEDIA

BACKGROUND OF THE INVENTION

1. Field of the Invention

The present invention generally relates to an electronic device such as a copying machine and a multifunction printer.

Priority is claimed on Japanese Patent Application No. 2009-115751, filed May 12, 2009, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, an image forming device such as a copying machine or a multifunction printer has been designed to incorporate the functionality of multiple devices so as to increase the value of the image forming device. An image forming device has been developed that can attach to and release from a storage medium and can transmit various data with the attached storage medium. The storage medium is, for example, a USB (Universal Serial Bus) memory and an SD (Secure Digital) card. Specifically, the image forming device can print an electronic file such as an image file or a document file stored in the storage medium. Also, the image forming device can read out a document image to generate the image file by a scanning function of the image forming device and make the generated image file stored in the storage medium.

The image forming device described above can cause leakage of classified information to a third party which should be prohibited from access due to an illegal use of the storage medium. For example, the storage medium that stores such classified information can be connected to the image forming device and the content of the classified information can be printed or copied.

A technique has been developed that prevents the same storage medium from being used with a plurality of information processing devices and prevents the illegal use of a software, the leakage of the classified information, and a manipulation of the classified information. Specific information is stored beforehand in the storage medium or a ROM in the information processing device. When the storage medium is accessed for the first time, the specific information is written into an SRAM in the information processing device or a specific area of the storage medium. When the storage medium is accessed for the second time or more, it is confirmed whether the specific information of the storage medium is identical to the specific information of the information processing device. If the specific information of the storage medium is not identical to the specific information of the information processing device, accessing the storage medium is prohibited.

Accordingly, the usage of the storage medium is limited to the specific information processing device, which is useful from the viewpoint of preventing leakage of classified information. However, the storage medium is widely prevalent, and it is inconvenient for a user if the usage of the storage medium is limited to the specific information processing device. The limitation of the usage of the storage medium sacrifices its usability.

As long as the storage medium is used in the specific information processing device that is permitted to use the storage medium, there is no restriction on using functions of the information processing device. All functions of the information processing device can be used. Therefore, the classified information stored in the information processing device can be copied to the storage medium and taken out, which is a problem in terms of security.

SUMMARY

The present invention provides an electronic device which usability can be increased keeping security.

An electronic device may include a connecting unit configured to be connected with a storage medium that is removable, the electronic device transmitting data with the storage medium that is connected with the connecting unit, a registration unit configured to register information that specifies the media that is permitted to transmit data with the electronic device, and a control unit configured to control whether to permit the electronic device to transmit data with the media that is connected with the connecting unit based on the information that is registered in the registration unit.

The registration unit may register identity information that specifies the storage medium that is permitted to transmit data with the electronic device.

The registration unit may register first identity information and second identity information, the first identity information specifying the storage medium with which transmitting of data is not limited, the second identity information specifying the storage medium with which transmitting of data is permitted only when the electronic device is used by a specified user.

The control unit may control whether or not to permit transmission of data with the storage medium that is connected with the connecting unit based on a result of checking the identity information that specifies the storage medium connected with the connecting unit and the identity information registered in the registration unit.

If the identity information that specifies the storage medium connected with the connecting unit belongs to the first identity information, then the control unit may permit the electronic device to transmit data with the storage medium without limitation.

If the identity information that specifies the storage medium connected with the connecting unit belongs to the second identity information, then the control unit may permit the electronic device to transmit data with the storage medium only when a specified user is authorized to use the electronic device.

The registration unit may register the identity information that specifies the storage medium permitted to transmit data with the electronic device and permission information that specifies a function permitted to be used in the electronic device, the identity information and the permission information corresponding to each other. If the identity information that specifies the storage medium connected with the connecting unit belongs to the identity information registered in the registration unit, the control unit may limit use of data transmitted with the storage medium connected with the connecting unit, which is performed using a function other than the function specified by the permission information corresponding to the identity information.

A method of controlling an electronic device may include controlling a transmission of data with a storage medium that is releasable and connected with the electronic device, registering information that specifies the storage medium that is permitted to transmit data with the electronic device, and controlling whether to permit the electronic device to transmit data with the storage device using the information.

The registration unit of the present invention registers information that specifies the storage medium that is permitted to transmit data with the electrical device. The control unit controls whether to permit the electrical device to transmit data with the storage medium connected with the connecting unit. If the information that specifies the storage medium that the user wants to use is registered in the registration unit, then the storage medium is available. Usage of the storage medium is not limited in a specified information processing device as in the conventional art. Usability of the electrical device of the present invention for the user can be increased keeping security.

BRIEF DESCRIPTION OF THE DRAWINGS

The above features and advantages of the present invention will be more apparent from the following description of certain preferred embodiments taken in conjunction with the accompanying drawings, in which:

FIG. 5 is a diagram illustrating an example of registration contents registered in the USB memory registration unit 22 in accordance with the second preferred embodiment of the present invention.

DETAILED DESCRIPTION OF THE PREFERRED EMBODIMENTS

The present invention will now be described herein with reference to illustrative embodiments. Those skilled in the art will recognize that many alternative embodiments can be accomplished using the teachings of the present invention and that the present invention is not limited to the embodiments illustrated for explanatory purposes. In the description below, the electronic device being a multifunction printer (an image forming device) will be described.

First Preferred Embodiment

Figure 1:
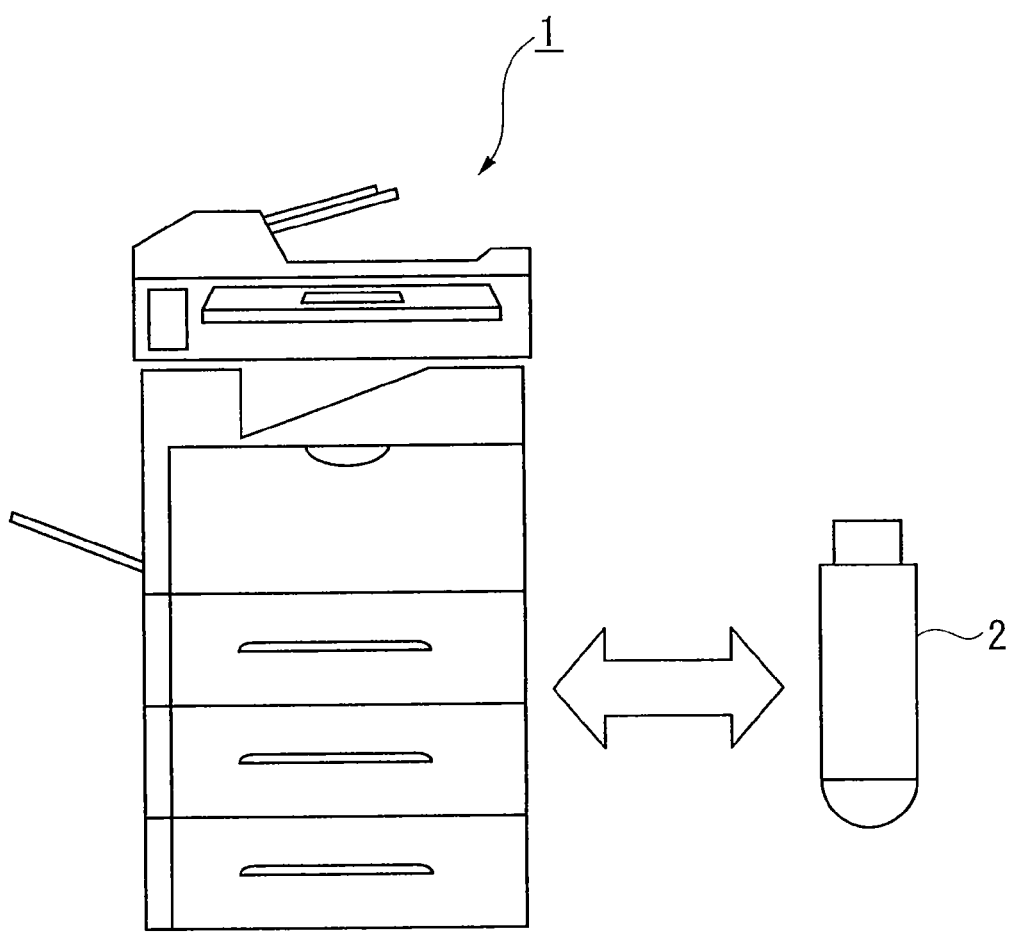
FIG. 1 is a view illustrating an electronic device in accordance with a first preferred embodiment of the present invention.

FIG. 1 is a view illustrating the electronic device in accordance with a first preferred embodiment of the present invention. A multifunction printer 1 is the electronic device in accordance with the first preferred embodiment of the present invention. The multifunction printer 1 has a copy function, a print function, and a facsimile transmitting and receiving function. A USB (Universal Serial Bus) memory 2 is a storage medium (a nonvolatile memory). The USB memory 2 is attached to the multifunction printer 1, and various data can be transmitted between the multifunction printer 1 and the USB memory 2. Attaching and releasing of the USB memory 2 are performed by a user of the multifunction printer 1.

Figure 2:
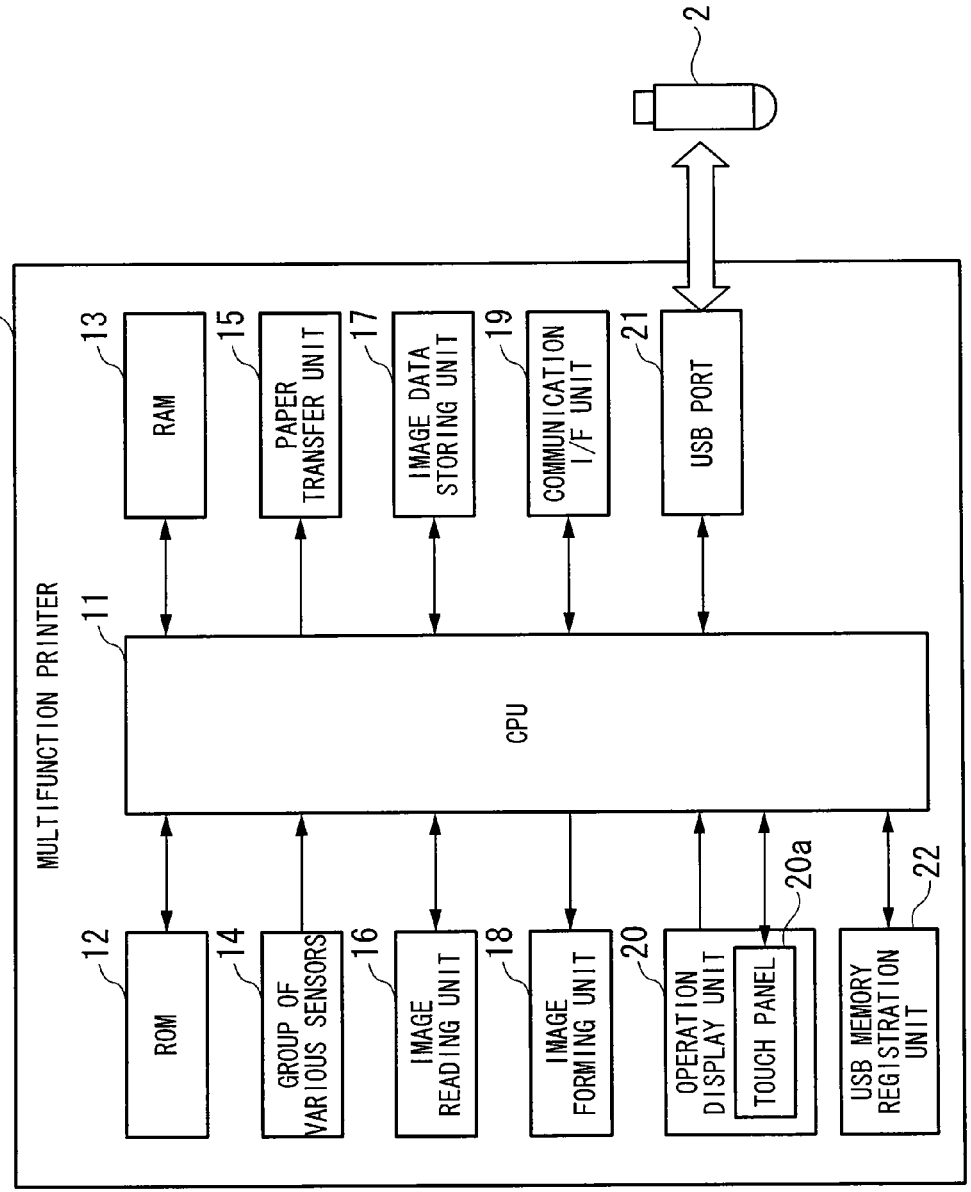
FIG. 2 is a block diagram illustrating a schematic configuration of the electronic device in accordance with the first preferred embodiment of the present invention.

FIG. 2 is a block diagram illustrating a schematic configuration of the electronic device in accordance with the first preferred embodiment of the present invention. As illustrated in FIG. 2, the multifunction printer 1 includes a CPU (Central Processing Unit) 11, a ROM (Read Only Memory) 12, a RAM (Random Access Memory) 13, a group of various sensors 14, a paper transfer unit 15, an image reading unit 16, an image data storing unit 17, an image forming unit 18, a communication I/F unit 19, an operation display unit 20, a USB port 21, and a USB memory registration unit 22. The CPU 11 is a controlling means. The USB port 21 is a connecting unit. The USB memory registration unit 22 is a registration means.

The CPU 11 controls the multifunction printer 1 based on various detected signals output from the group of various sensors 14 and various instructions, which is performed using a control program stored in the ROM 12. The various instructions are, for example, an operation instruction output from the operation display unit 20 and various instructions output from a client computer (that is not illustrated in the figure) through the communication I/F unit 19. The CPU 11 controls reading of an image data by the image reading unit 16, printing of various image data such as document image data, print image data and facsimile image data, and transmitting of the various image data.

The CPU 11 controls whether or not to allow reading and writing of data of the USB memory 2 attached to the USB port 21, which is performed based on a registration contents that is registered in the USB memory registration unit 22. Owing to this control by the CPU 11, usability of the USB memory 2 can be increased for a user keeping security. Details of the control by the CPU 11 will be described below.

The ROM 12 is a nonvolatile memory that stores the control program executed by the CPU 11 and other data. The RAM 13 is a volatile memory that is used as a working area that stores temporal data when the CPU 11 executes the control program and performs various processes. The group of various sensors 14 include various sensors such as a sensor that detects out-of-paper condition, a sensor that detects paper-jammed condition, a sensor that detects position of paper, and sensor that detects temperature, which are necessary in forming an image. The CPU 11 receives detected signals including various information detected in each of the sensors.

The paper transfer unit 15 includes a transfer roller and a motor for driving the transfer roller. The paper transfer unit 15 transfers a printing paper that is stored in a paper tray to the image forming unit 18. The paper transfer unit 15 transfers the printing paper on which an image forming process is performed at the image forming unit 18 to a catch tray (that is not illustrated in the figure). The image reading unit 16 includes an ADF (Auto Document Feeder) and a CCD (Charge Coupled Device) sensor. The CCD sensor reads an image of a document that is transferred in series by the ADF, which is controlled by the image reading unit 16. The image reading unit 16 outputs a document image data corresponding to the image of the document. The document image data output from the image reading unit 16 is stored in the image data storing unit 17, which is controlled by the CPU 11.

The image data storing unit 17 includes a memory such as a flash memory. The image data storing unit 17 stores the document image data, a print image data and a facsimile image data, which is controlled by the CPU 11. The print image data is output from the client computer and received by the communication I/F unit 19. The facsimile image data is output from the Public Switched Telephone Network (that is not illustrated in the figure) and received by the communication I/F unit 19. The image data storing unit 17 also stores various image data read from the USB memory 2 through the USB port 21.

The image forming unit 18 performs the image forming process using the various image data such as the document image data, the print image data and the facsimile image data stored in the image data storing unit 17, which is controlled by the CPU 11. Specifically, the image forming unit 18 copies an image-forming image to the printing paper using a toner. The image-forming image corresponds to the various image data. The printing paper is transferred from the paper transfer unit 15. The image forming unit 18 performs a fusing process on the image-forming image using a fuser roller. The communication I/F unit 19 is connected to the client computer or the Public Switched Telephone Network. The communication I/F unit 19 communicates with the client computer or the Public Switched Telephone Network.

The operation display unit 20 includes a touch panel 20a and various operation keys. The various operation keys perform various operations. The various operations by the various operation keys are communicated to the CPU 11. The touch panel 20a displays various information, which is controlled by the CPU 11. The various keys are, for example, a key that switches a copy function, a key that switches a print function, a key that switches a scan function, a key that switches a facsimile function, a start key, a stop and clear key, a power key, and number input keys. Each of the key that switches a copy function, the key that switches a print function, the key that switches a scan function, and the key that switches a facsimile function switches the current operation mode of the multifunction printer 1 to the operation mode that the user wants to use and corresponds to the operated key.

The USB port 21 is a serial interface that suits to the USB standard. When the USB memory 2 is attached to the USB port 21, the USB memory 2 is electrically connected to the USB port 21. When the USB memory 2 is connected to the USB port 21, the USB port 21 transmits various data with the USB memory 2, which is controlled by the CPU 11. Reading and writing of data in the USB memory 2 is limited by the CPU 11 based on the registration contents of the USB memory registration unit 22. Details will be described below.

The USB memory registration unit 22 registers information that specifies a USB memory that is permitted to read and write. The specified USB memory is selected from a group of the USB memories attached to the USB port 21. Specifically, identity information specifies the USB memory that is permitted to read and write. The identity information is such as a serial number that is allocated to each USB memory. The serial number of the USB memory that the user wants to use is registered in the USB memory registration unit 22.

The USB memory registration unit 22 may register two kinds of serial numbers, first identity information and second identity information. The first identity information is the serial number of the USB memory for registering an administrator. The second identity information is the serial number of the USB memory for registering a general user. The USB memory for registering the administrator is used by the administrator of the multifunction printer 1. The USB memory for registering the administrator is allowed to be read and written without limitation when attached to the multifunction printer 1. The USB memory for registering a general user is used by a general user (except the administrator). Only when it is authorized that the user of the USB memory for registering a general user is registered beforehand, the USB memory for registering a general user is allowed to be read and written. By registering the two kinds of serial numbers, security can be attained.

Figure 3:
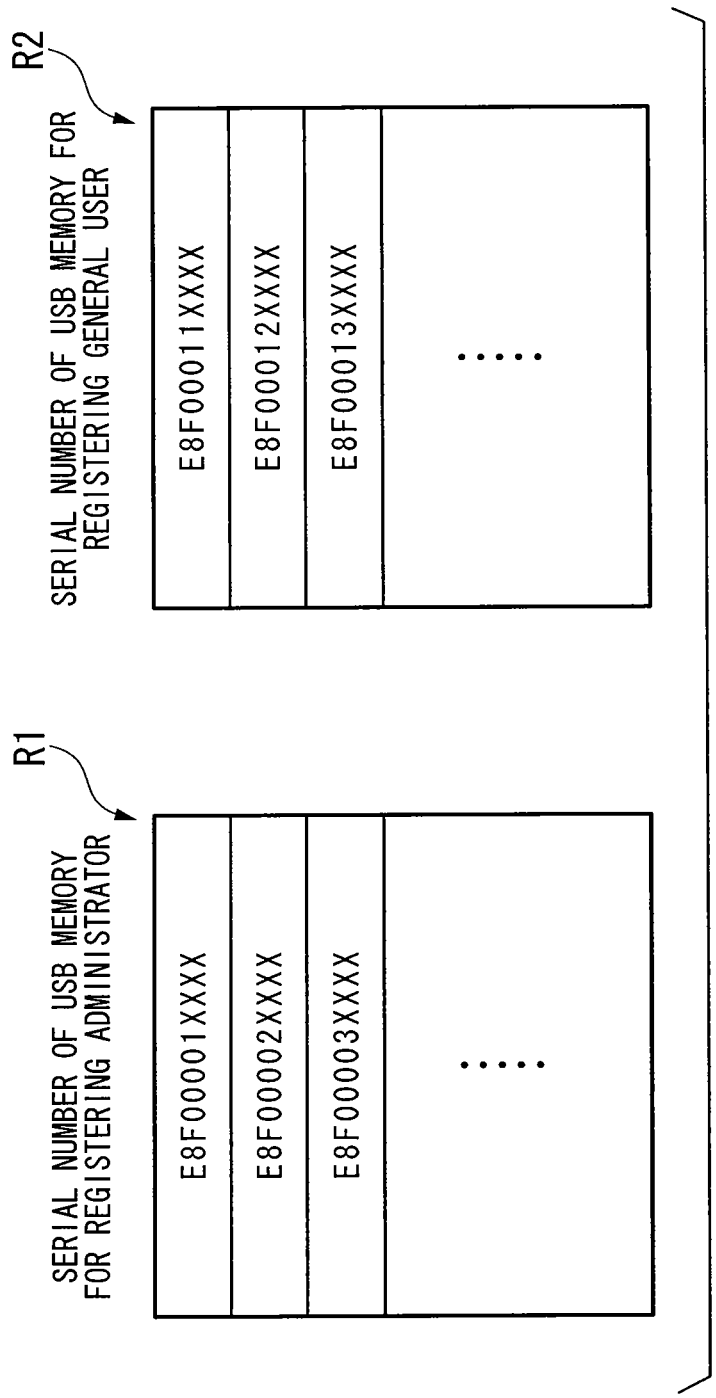
FIG. 3 is a diagram illustrating an example of registration contents registered in a USB memory registration unit 22 in accordance with the first preferred embodiment of the present invention.

FIG. 3 is a diagram illustrating an example of the registration contents registered in the USB memory registration unit 22 in accordance with the first preferred embodiment of the present invention. The USB memory registration unit 22 includes a registration area R1 and a registration area R2. The registration area R1 registers the serial number of the USB memory for registering the administrator. The registration area R2 registers the serial number of the USB memory for registering a general user. Each serial number of the USB memory is registered in either the registration area R1 or the registration area R2, which is instructed by the user of the multifunction printer 1 including the administrator.

As illustrated in FIG. 3, the registration area R1 and the registration area R2 store the serial number of each USB memory. The registration area R1 and the registration area R2 may store a user ID corresponding to the serial number. Each user using the multifunction printer 1 is specified by the user ID. Each user is distinguished by the user ID. In the first preferred embodiment of the present invention, each serial number has a corresponding user ID. The serial number of the USB memory is registered in the USB memory registration unit 22, which is operated by the user. The operation is, for example, by various operation keys of the operation display unit 20 or by the client computer.

Figure 4:
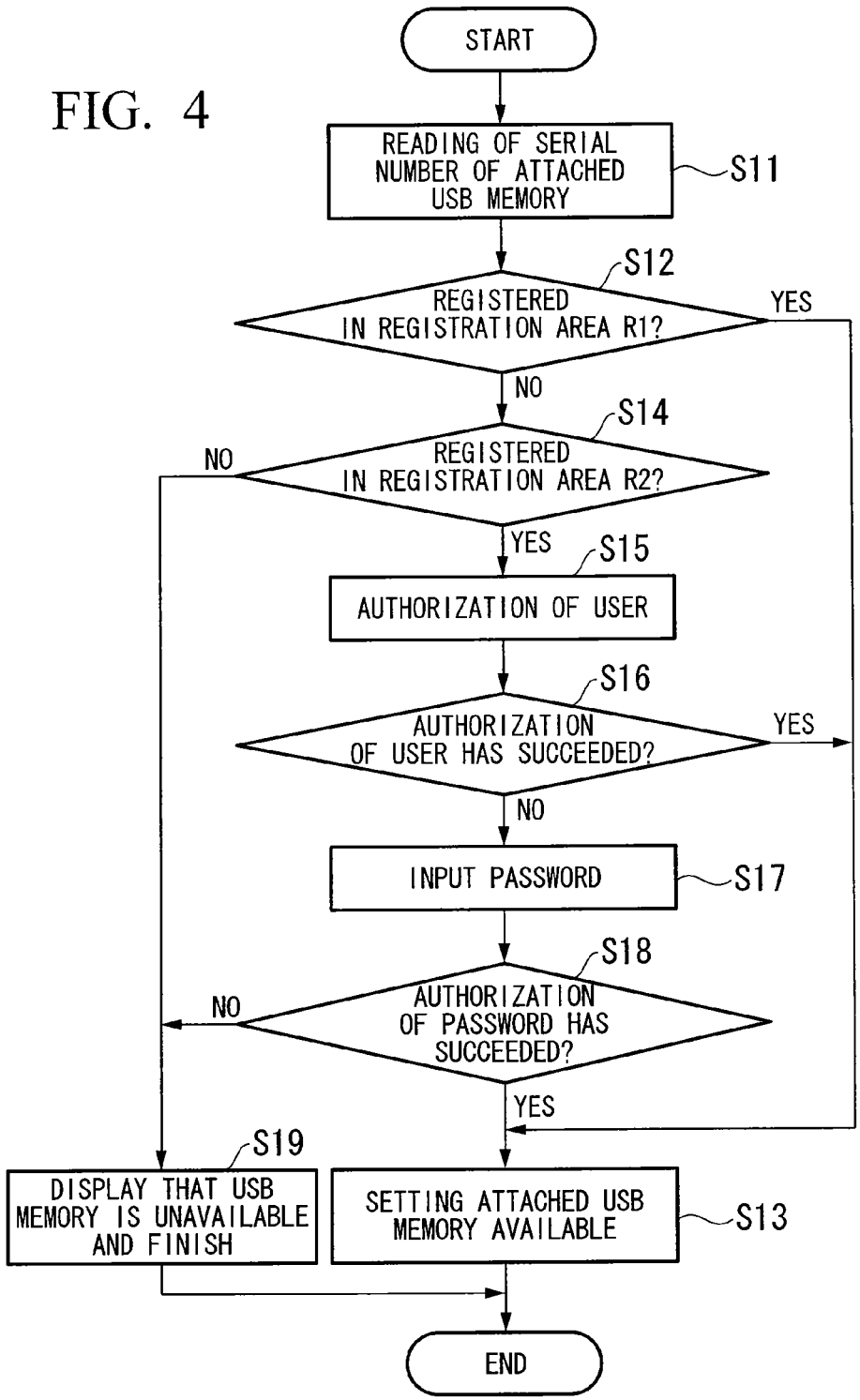
FIG. 4 is a flow chart illustrating a behavior of the electronic device in accordance with the first preferred embodiment of the present invention.

Details of a behavior of the multifunction printer 1 of the configuration described above will be described. FIG. 4 is a flow chart illustrating the behavior of the electronic device in accordance with the first preferred embodiment of the present invention. A process of FIG. 4 starts when the user of the multifunction printer 1 attaches the USB memory 2 to the USB port 21 of the multifunction printer 1.

(Step S11)

When the process is started, the serial number of the USB memory 2 attached to the USB port 21 is read.

(Step S12)

Next, the USB memory registration unit 22 is searched by the CPU 11. It is determined whether or not the serial number of the USB memory 2 is registered in the registration area R1 of the USB memory registration unit 22.

(Step S13)

When it is determined that the serial number of the USB memory 2 is registered in the registration area R1 (result of the determination is "Yes"), the USB memory 2 attached to the USB port 21 is set to be available, which is controlled by the CPU 11. Then reading and writing of data of the USB memory 2 attached to the USB port 21 is available.

(Step S14)

When it is determined that the serial number of the USB memory 2 is not registered in the registration area R1 (the result of the determination is "No"), it is determined whether or not the serial number is registered in the registration area R2 of the USB memory registration unit 22.

(Step S15)

When it is determined that the serial number of the USB memory 2 is registered in the registration area R2 (the result of the determination is "Yes"), authorization of the user is performed by the CPU 11.

Specifically, it is confirmed whether a log-in ID that is an ID of user who logs in the multifunction printer 1 is identical to an administrator ID specifying the administrator of the multifunction printer 1. Alternately, it is confirmed whether or not the log-in ID is identical to the serial number of the USB memory 2 attached to the USB port 21. Also, it is confirmed whether or not the log-in ID is identical to the user ID that is registered in the registration area R2 of the USB memory registration unit 22. The user ID corresponds to the serial number of the USB memory 2.
(Step S16)

Next, it is determined whether or not the authorization of the user has succeeded. When the log-in ID is identical to the administrator ID, or the log-in ID is identical to the user ID described above (the result of the determination is "Yes"), the authorization of the user has succeeded and the USB memory 2 attached to the USB port 21 is set to be available, which is controlled by the CPU 11 (Step S13). The USB memory 2 attached to the USB port 21 is allowed to be read and written.
(Step S17)

When the log-in ID is not identical to the administrator ID and the log-in ID is not identical to the user ID described above (the result of the determination is "No"), the authorization of the user has failed and the operation display unit 20 displays a request for the input of a password to log in the multifunction printer 1, which is controlled by the CPU 11. When the password is input by the user, logging in the multifunction printer 1 is performed. The user ID of a user who logs in is specified by the password input by the user.
(Step S18)

Next, an authorization process like Step 15 is performed by the CPU 15, and it is determined whether the authorization of the password has succeeded or not. When it is determined that the authorization of the password has succeeded (the result of the determination is "Yes"), the USB memory 2 attached to the USB port 21 is set to be available, which is controlled by the CPU 11 (Step S13). The USB memory 2 attached to the USB port 21 is allowed to be read and written.
(Step S19)

When it is determined that the authorization of the password has failed (the result of the determination is "No"), the operation display unit 20 displays that the USB memory 2 attached to the USB port 21 is unavailable, which is controlled by the CPU 11. Then a series of process is finished. Alternately, when the result of the determination of Step S14 is "No", the process of Step S19 is performed.

As is described above, in the first preferred embodiment of the present invention, the USB memory registration unit 22 that can register the serial numbers of the USB memories that are available in the multifunction printer 1 is disposed. Whether to permit reading and writing of data of the USB memory 2 attached to the USB port 21 or not is controlled based on the registration contents of the USB memory registration unit 22. As a result, only the USB memories which serial numbers are registered in the USB memory registration unit 22 can be available in the multifunction printer 1. The USB memories can be managed easily and its usability can be increased.

The serial number of the USB memory for registering the administrator that is used by the administrator of the multifunction printer 1 and the serial number of the USB memory for registering the general user that is used by the general user of the multifunction printer 1 are registered separately in the USB memory registration unit 22. When the USB memory for registering the general user is attached to the USB port 21, whether to permit reading and writing of data or not is controlled only when the user is authorized as the specified user. As a result, illegal use by a third party can be prevented, and security can be improved.

Second Preferred Embodiment

Next, the electronic device in accordance with a second preferred embodiment of the present invention will be described. An outside view and an internal configuration of the multifunction printer as an example of the electronic device in accordance with the second preferred embodiment of the present invention is approximately the same as those of the multifunction printer 1 illustrated in FIG. 1 and FIG. 2. The multifunction printer 1 in accordance with the first preferred embodiment of the present invention only controls whether or not to permit reading and writing of data of the USB memory attached to the USB port 21. On the other hand, the multifunction printer in accordance with the second preferred embodiment of the present invention limits the usage of data transmitted between the USB port 21 and the USB memory. The usage of data in a function that is not registered beforehand is prohibited.

FIG. 5 is a diagram illustrating an example of registration contents registered in the USB memory registration unit 22 in accordance with the second preferred embodiment of the present invention. As illustrated in FIG. 5, in the second preferred embodiment of the present invention, the registration contents include a first field F1, a second field F2 and a third field F3. The serial number of the USB memory which data is allowed to be read and written is registered in the first field F1. The above USB memory is selected from the USB memories that can be attached to the USB port 21. Availability information that shows whether or not to permit the usage of the function of the multifunction printer is registered in the second field F2. Permission information that shows the function that is allowed to be used is registered in the third field F3. The function is selected from functions of the multifunction printer. Information in the second field F2 and the third field F3 are registered corresponding to the serial number registered in the first field F1. Only the administrator of the multifunction printer is permitted to change the registration contents of the USB memory registration unit 22, for example, an addition and a deletion.

In the example illustrated in FIG. 5, the second field F2 stores three types of availability information, "all available", "partly available" and "unavailable". "all available" means that data of the USB memory 2 attached to the USB port 21 is available in all functions of the multifunction printer. "partly available" means that data of the USB memory 2 attached to the USB port 21 is available in part of the functions of the multifunction printer. "unavailable" means that data of the USB memory 2 attached to the USB port 21 is unavailable in all functions of the multifunction printer.

In the example illustrated in FIG. 5, the third field F3 includes a first, a second, a third and a fourth sub-fields corresponding to the permission information. The first sub-field is "USB to PRINT". The second sub-field is "SCAN to USB". The third sub-field is "USB to BOX". The fourth sub-field is "BOX to USB". The first sub-field "USB to PRINT" stores the information that shows whether to permit printing data of the USB memory 2 or not. That is, the information stored in the first sub-field "USB to PRINT" shows whether to permit using the data of the USB memory 2 in the image forming unit 18 or not. The second sub-field "SCAN to USB" stores the information that shows whether to permit writing data of the image data read by the image reading unit 16 in the USB memory 2 or not.

The third sub-field "USB to BOX" stores the information that shows whether to permit reading data of the USB memory 2 and storing the data in the image data storing unit 17. The fourth sub-field "BOX to USB" stores the information that shows whether to permit writing data stored in the image data storing unit 17 in the USB memory 2 or not. That is, the information stored in the third sub-field "USB to BOX" and the fourth sub-field "BOX to USB" shows whether to permit usage of the image data storing unit 17 when transmitting data of the USB memory 2.

In the example illustrated in FIG. 5, when the USB memory 2 of the serial number "E8F00097XXXX" is attached to the USB port 21, three functions are permitted. The three functions are printing the information stored in the USB memory 2 (USB to PRINT), reading the information stored in the USB memory 2 and storing the information in the image data storing unit 17 (USB to BOX), and writing the information stored in the image data storing unit 17 in the USB memory 2 (BOX to USB). When the USB memory 2 of the serial number that is not registered in the USB memory registration unit 22 is attached to the USB port 21 ("OUT OF REGISTRATION" in FIG. 5), it is permitted to write image data that is read by the image reading unit 16 in the USB memory 2 (SCAN to USB).

The behavior of the multifunction printer in accordance with the second preferred embodiment will be described. When the USB memory 2 is attached to the USB port 21 of the multifunction printer by the user of the multifunction printer, the serial number of the USB memory 2 attached to the USB port 21 is read by the CPU 11. Next, the serial number is searched in the USB memory registration unit 22 by the CPU 11, and it is determined whether the serial number of the USB memory 2 is registered in the first field F1 of the USB memory registration unit 22.

When it is determined that the serial number of the USB memory 2 is registered in the first field F1, the operation display unit 20 displays a list of available functions and unavailable functions based on the registration contents of the USB memory registration unit 22, which is controlled by the CPU 11. A format of the list that is displayed is arbitrary. Only the available functions may be displayed. The available functions may be displayed in dark and the unavailable functions may be displayed in faint. By referring to the list that is displayed, the user is informed of the available functions and the unavailable functions of the multifunction printer.

When the user operates the touch panel 20a and selects one function of the available functions, the CPU 11 refers the third field F3 to determine whether the function selected by the user is available or not, and executes the function if the function that is selected is available. When the function selected by the user is unavailable, usage of the function is limited by the CPU 11.

As is described above, in the second preferred embodiment of the present invention, the serial number of the USB memory that is available in the multifunction printer and the availability information that specifies the available functions of the multifunction printer are registered in the USB memory registration unit 22, the serial number of the USB memory and the availability information being related to each other. When the serial number of the USB memory 2 attached to the USB port 21 is registered in the USB memory registration unit 22, functions of the multifunction printer are limited based on the permission information corresponding to the serial number. Therefore, the USB memory 2 that is available in the multifunction printer can be limited. The USB memory 2 can be easily controlled, and the available functions of the multifunction printer that corresponds to the USB memory 2 can be limited. Its usability is improved keeping security.

The electronic device in accordance with the preferred embodiments of the present invention was described above. It is apparent that the present invention is not limited to the above preferred embodiments, but may be modified and changed without departing from the scope of the present invention. For example, the storage medium available in the present invention is not limited to the USB memory, but may be any storage medium such as an SD card, a Compact Flash™, a Memory Stick™, a smart media, a flexible disk, a CD-R, a CD-RW, a DVD™-R, a DVD-RW, and a MO disk.

The case when the electronic device in accordance with the preferred embodiments of the present invention is the multifunction printer that is an example of the image forming device was described above. But the present invention is not limited to the multifunction printer but may be any electronic device such as a personal computer as long as the electronic device has the connecting unit to which the storage medium is to be attached.

What is claimed is:

1. An electronic device including a connecting unit configured to be connected with a storage medium that is removable, the electronic device transmitting data with the storage medium that is connected with the connecting unit, the electronic device comprising:
   a registration unit configured to register information that specifies the storage medium that is permitted to transmit data with the electronic device, among the storage media connected with the connecting unit; and
   a control unit configured to control whether to permit the electronic device to transmit data with the storage medium that is connected with the connecting unit based on the information that is registered in the registration unit, wherein
   the storage medium is allocated with identity information that is uniquely determined,
   the registration unit registers the identity information allocated to the storage medium in the electronic device as information that specifies the storage medium that is permitted to transmit data with the electronic device,
   the registration unit registers identity information allocated to the storage medium with which transmitting of data is not limited as first identity information, and identity information allocated to the storage medium with which transmitting of data is permitted only when the electronic device is used by a specified user as second identity information,
   the registration unit registers the identity information that is allocated to the storage medium permitted to transmit data with the electronic device and permission information that specifies a function permitted to be used, among functions provided in the electronic device, the identity information and the permission information corresponding to each other,
   the permission information including a first, a second, a third and a fourth sub-fields, wherein the first sub-field stores information that shows whether to permit printing data of the storage medium or not, the second sub-field stores information that shows whether to permit writing data of an image data that is read by an image reading unit in the storage medium or not, the third sub-field stores information that shows whether to permit reading data of the storage medium and storing the data in an image data storing unit, and the fourth sub-field stores information that shows whether to permit writing data stored in the image data storing unit in the storage medium or not;
   if the identity information that is allocated to the storage medium connected with the connecting unit belongs to the identity information registered in the registration unit, the control unit limits use of data transmitted with the storage medium connected with the connecting unit, which is performed using a function other than the function specified by the permission information corresponding to the identity information; and when the storage medium of the identity information that is not registered in the registration unit is connected with the connecting unit, it is only permitted to write the image data that is read by the image reading unit in the storage medium.

2. The electronic device according to claim 1, wherein the control unit controls whether or not to permit transmission of data with the storage medium that is connected with the connecting unit based on a result of checking the identity information that is allocated to the storage medium connected with the connecting unit and the identity information registered in the registration unit.

3. The electronic device according to claim 1, wherein, if the identity information that is allocated to the storage medium connected with the connecting unit belongs to the first identity information, then the control unit permits the electronic device to transmit data with the storage medium connected with the connecting unit without limitation.

4. The electronic device according to claim 1, wherein, if the identity information that is allocated to the storage medium connected with the connecting unit belongs to the second identity information, then the control unit permits the electronic device to transmit data with the storage medium connected with the connecting unit only when it is authorized that a user is the specified user.

5. The electronic device according to claim 1, wherein the first identity information is registered in a first registration area provided in the registration unit, and the second identity information is registered in a second registration area provided in the registration unit.

6. The electronic device according to claim 5, wherein the control unit reads out the identity information that is allocated to the storage medium connected with the connecting unit, checks the read identity information and the first identity information registered in the first registration area, and sets the electronic device to a state capable of transmitting data with the storage medium connected with the connecting unit if it is determined that the identity information that is read out from the storage medium is registered in the first registration area.

7. The electronic device according to claim 5, wherein the control unit reads out the identity information that is allocated to the storage medium connected with the connecting unit, checks the read identity information and the first identity information registered in the first registration area, and determines whether or not the identity information that is read out from the storage medium is registered in the second registration area if it is determined that the identity information that is read out from the storage medium is not registered in the first registration area.

8. The electronic device according to claim 7, wherein, if it is determined that the identity information that is read out from the storage medium is registered in the second registration area as a result of the determination, the control unit checks whether or not a log-in ID that is an ID of a user who logs in the electronic device, is identical to an administrator ID allocated to an administrator of the electronic device, and checks whether or not the log-in ID is identical to the user ID corresponding to the identity information that is read out from the storage medium registered in the second registration area, the user ID corresponding to the number of the identity information of the storage medium connected with the connecting unit.

9. The electronic device according to claim 8, wherein, if the log-in ID is identical to the administrator ID or the log-in ID is identical to the user ID, the control unit determines that the authorization has succeeded and sets the electronic device to a state capable of transmitting data with the storage medium connected with the connecting unit.

10. The electronic device according to claim 8, wherein, if the log-in ID is not identical to the administrator ID and the log-in ID is not identical to the user ID, the control unit determines that the authorization has failed and allows the operation display unit to display a request for the input of a password to log in to the electronic device, and when the password is input by the user, logging into the electronic device is performed and the user ID of a user who logs in is specified by the password input by the user.

* * * * *